United States Patent [19]
Townsend

[11] 3,717,903
[45] Feb. 27, 1973

[54] HAND OPERATED FISH SKINNING TOOL
[75] Inventor: Ray T. Townsend, Des Moines, Iowa
[73] Assignee: Townsend Engineering Company, Des Moines, Iowa
[22] Filed: Nov. 9, 1970
[21] Appl. No.: 87,819

[52] U.S. Cl. ...........................17/67, 17/50, 17/62, 146/130
[51] Int. Cl. ................................A22c 25/17
[58] Field of Search .........17/62, 67, 29, 50; 146/130

[56] References Cited
UNITED STATES PATENTS

| 2,547,237 | 4/1951 | Townsend | 17/67 |
| 2,540,462 | 2/1951 | Smith | 146/130 X |
| 3,164,858 | 1/1965 | DeMoss | 17/67 |

FOREIGN PATENTS OR APPLICATIONS

| 731,958 | 6/1932 | France | 17/29 |

Primary Examiner—Lucie H. Laudenslager
Attorney—Zarley, McKee & Thomte

[57] ABSTRACT

A hand operated fish skinning tool comprising a support means having a curved pressure surface formed thereon with a handle means extending rearwardly therefrom at one end thereof. A toothed roller is rotatably mounted on the support means so that the curved pressure surface partially extends around the roller. An actuating element is connected to one end of the roller for actuating the same so that the actuating element is positioned at one end of the support means and the handle means is positioned at the other end of the support means. A pair of spring clips embrace shaft stubs extending from opposite ends of the roller and are connected to opposite ends of the support means to yieldably urge the toothed roller into engagement with the curved pressure surface.

6 Claims, 5 Drawing Figures

PATENTED FEB 27 1973

3,717,903

Inventor
Ray T. Townsend
by Zarley, McKee & Thomte
Attorneys

HAND OPERATED FISH SKINNING TOOL

This invention relates to an improvement in hand operating fish skinning tools. Conventional hand operated fish skinning tools such as that disclosed in U.S. Pat. No. 2,547,237 have been generally satisfactory but some difficulty has been experienced in the manufacture and assembly thereof. Additionally, some difficulty has been experienced in achieving proper pressure between the toothed roller and curved pressure surfaces of those type devices.

Therefore, it is a principal object of this invention to provide an improved fish skinning device.

A further object of this invention is to provide a hand operated fish skinning device wherein the toothed roller is yieldably urged towards the curved pressure surface by a spring clip means at each end thereof.

A further object of this invention is to provide a hand operated fish skinning tool wherein a handle means is provided at one end of the device and an actuating element is provided at the other end of the device.

A further object of this invention is to provide a hand operated fish skinning device wherein the toothed roller is yieldably urged towards the curved pressure surface by a spring clip means at each end thereof.

A further object of this invention is to provide a hand operated fish skinning tool wherein a handle means is provided at one end of the device and an actuating element is provided at the other end of the device.

A further object of this invention is to provide a hand operated fish skinning tool which achieves the proper pressure between the curved pressure surface and the toothed roller.

A further object of this invention is to provide a hand operated fish skinning tool which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

Figures 1, 2, 3, 4, 5:
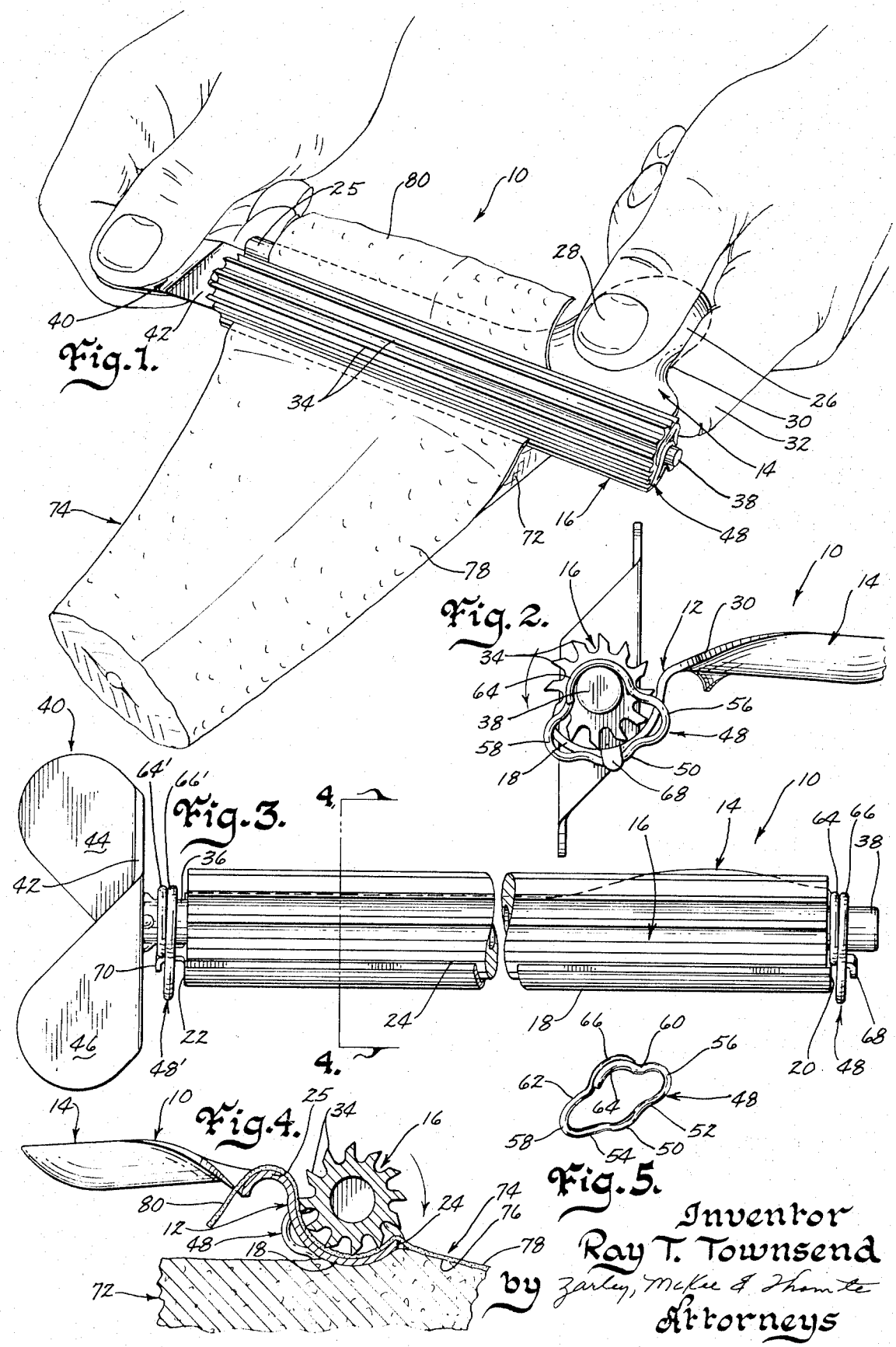
FIG. 1 is a front perspective view of the device illustrating the device being used to remove the skin from a piece of fish.
FIG. 2 is a side view of the device.
FIG. 3 is a partial front view of the device.
FIG. 4 is a sectional view seen along lines 4—4 illustrating the device removing the skin from the fish.
FIG. 5 is a perspective view of the spring clip which is mounted at the opposite ends of the toothed roller.

The tool of this invention is referred to generally by the reference numeral 10 comprising generally a support means 12, handle 14 and toothed pressure roller 16. Support means 12 includes a curved pressure surface 18 having opposite ends 20 and 22. A leading cutting edge 24 is provided on the forward end of the pressure surface 18 while a ramp area 25 is provided at the upper rearward end of the pressure surface 18 laterally of the handle 14. Handle 14 is integrally formed with support means 12 and is positioned at one end thereof as illustrated in the drawings. Handle 14 includes a curved depression area 26 formed in its upper surface to define a thumb receiving area which receives the thumb 28 of the operator's hand therein as illustrated in FIG. 1. Handle 14 also includes a recessed area 30 extending inwardly into its outer edge which is adapted to receive the index finger 32 of the operator's hand as also illustrated in FIG. 1.

Toothed pressure roller 16 includes a plurality of outwardly extending teeth 34 having the configuration best seen in FIG. 4. Roller 16 has shaft stubs 36 and 38 extending outwardly from the opposite ends thereof. An actuating element 40 in the form of a wing nut stamped from suitable material is secured to shaft stub 36 by any convenient means for rotating roller 16. More specifically, element 40 includes a flat central portion 42 having a pair of ears 44 and 46 extending therefrom in a perpendicular relationship with respect thereto. Roller 16 is rotatably mounted on support means 12 so that the curved pressure surface 18 partially extends around the roller 16. Identical spring clips 48 and 48' effect the connection between the roller 16 and support means 12. Since spring clips 48 and 48' are identical, only spring clip 48 will be described in detail with "'''" indicating identical structure on clip 48'. Clip 48 is formed from a spring wire material and generally includes an arcuate portion 50 having legs 52 and 54 extending outwardly therefrom which terminate in loop portions 56 and 58 respectively. Legs 60 and 62 extend from loop portions 56 and 58 respectively and terminate in arcuate portions 64 and 66 respectively which are positioned adjacent each other as illustrated in FIG. 5.

As shown in FIG. 3, tabs 68 and 70 extend outwardly and thence downwardly from ends 20 and 22 of pressure surface 18 to permit the attachment of the spring clips 48 and 48' thereto. In FIG. 2, it can be seen that spring clip 48 provides the connection between one end of the roller 16 and the support means 12 by means of arcuate portions 64 and 66 extending around shaft stub 38 and by means of arcuate portion 50 extending around and beneath tab 68. Similarly, arcuate portions 64' and 66' extend around shaft stub 38 with arcuate portion 50' (not shown) extending around and beneath tab 70.

The numeral 72 designates a slab or filet of fish having a skin 74 thereon. For purposes of explanation, skin 74 will be described as having an inner surface 76 and an outer surface 78. In operation, the device 10 is grasped by the operator as illustrated in FIG. 1. As seen in FIG. 1, the thumb 28 of the operator's left hand is received in the depression area 26 with the index finger 32 being received in the recessed area 30. The actuating element 40 is grasped by the operator's right hand as also illustrated in FIG. 1. The fact that the actuating element 40 is at one end of the device and the handle 14 being at the other end of the device provides an extremely well balanced tool which does not tend to move out of operating position as the actuating element 40 is being operated. Objectionable movement of the device 10 is also prevented by the relationship of the thumb 28 with the depression area 26 and the relationship between the index finger 32 and the recessed area 30. The initial step to be performed when removing the skin from the fish is to insert the leading cutting edge 24 under the skin 74. The edge 24 need be inserted only a slight distance under the skin. The operator then rotates the actuating element 40 which causes the roller 16 to be rotated in the direction indicated by the arrow in FIG. 4. The roller 16 being thus rotated grips the skin between itself and the pressure surface 18, whereupon rotation of the roller pulls the skin, a severed portion of which is indicated at 80. The edge 24 performs a severing operation and the roller 16 furnishes the means whereby both the skinning and pulling operations are accomplished. Initially, the teeth 34 engage the pressure surface 18 as seen in FIG. 2. The spring clips 48 and 48' permit the roller 16 to move away from the pressure surface 18 as the skin passes therebetween. The spring clips 48 and 48' permit the roller 16 to move away from the pressure surface 18 so that the device can accommodate different skin thicknesses. Additionally, the resiliency of the spring clips 48 and 48' cause the teeth 34 to grip the skin 74 with the proper amount of force so that the skin is pulled from the fish and passed over the ramp area 25. Thus, the spring clips 48 and 48' insure that proper gripping action will always be supplied to the fish skin by the teeth 34. The spring clips 48 and 48' also permit the device to be easily and quickly disassembled and assembled for cleaning purposes or for purposes of repair. Thus it can be seen that the device accomplishes at least all of its stated objectives.

I claim:
1. A hand operated fish skinning tool, comprising,
a support means having a curved pressure surface formed thereon,
a pressure roller rotatably mounted on said support means so that said curved pressure surface partially extends around said roller,
a handle means on said support means,
an actuating element operatively connected to said roller for rotating said roller,
each of said support means and said pressure roller having first and second ends,
a first spring means connecting said first end of said support means and said first end of said roller,
and a second spring means connecting said second end of said support means and said second end of said roller,
said first and second spring means yieldably urging said pressure roller towards said pressure surface so that said pressure surface will engage the inner surface of the fish skin while said pressure roller will engage the outer surface thereof as said pressure roller propels the skin past said pressure surface as said roller is rotated.

2. The tool of claim 1 wherein said pressure roller has first and second shaft stubs extending from its first and second ends, said first and second spring means extending around said first and second shaft stubs respectively and being operatively connected to said first and second ends of said support means respectively.

3. The tool of claim 2 wherein said first and second ends of said support means have first and second tabs extending therefrom respectively, said first and second spring means engaging said first and second tabs respectively.

4. The tool of claim 3 wherein each of said first and second spring means comprise a spring clip having oppositely disposed first and second arcuate portions, oppositely disposed first and second legs extending from said first arcuate portion, oppositely disposed third and fourth legs extending from said arcuate portion, a first loop portion interconnecting said first and third legs, a second loop portion interconnecting said second and fourth legs, said legs and loop portions yieldably resisting the movement of said arcuate portions away from each other, one of said arcuate portions embracing one of said shaft stubs, the other of said arcuate portions engaging one of said tabs.

5. A hand operated fish skinning tool, comprising,
a support means having a curved pressure surface formed thereon, said support means having first and second ends,
a toothed roller rotatably mounted on said support means so that said curved pressure surface partially extends around said roller,
a handle means at said first end of said support means extending therefrom,
an actuating element operatively connected to said roller at said second end of said support means for rotating said roller by one hand while the other hand is used to grasp said handle means,
the rotation of said actuating element causing said pressure surfaces to engage the inner surface of the fish skin while said toothed roller engages the outer surface thereof and propels the skin past said pressure surface as said roller is rotated,
and resilient means connecting the opposite ends of said toothed roller to said support means so that said toothed roller is yieldably maintained closely adjacent said curved pressure surface.

6. The tool of claim 5 wherein said handle means has upper and lower surfaces, said upper surface having a depression formed therein adapted to at least partially receive the thumb of said other hand, said handle means having an outer end, said outer end having an arcuate recessed portion formed therein adapted to at least partially receive a portion of the index finger of said other hand, said handle means and said support means being of one-piece construction.

* * * * *